Feb. 3, 1970   N. K. BROWN   3,492,949
STEERING VEHICLES ALONG A TRACK
Filed Dec. 15, 1967   4 Sheets-Sheet 1
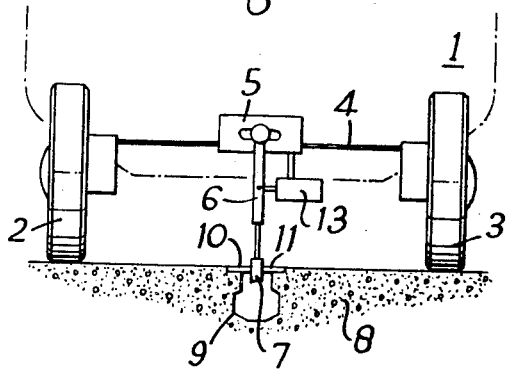
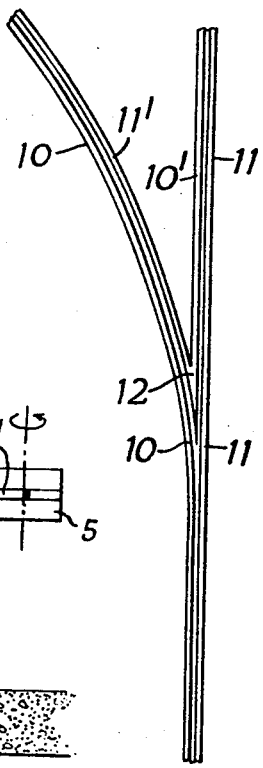
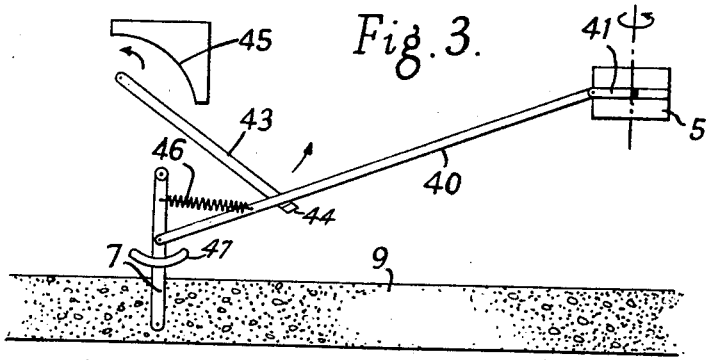
INVENTOR
NORMAN K. BROWN
BY
ATTORNEY

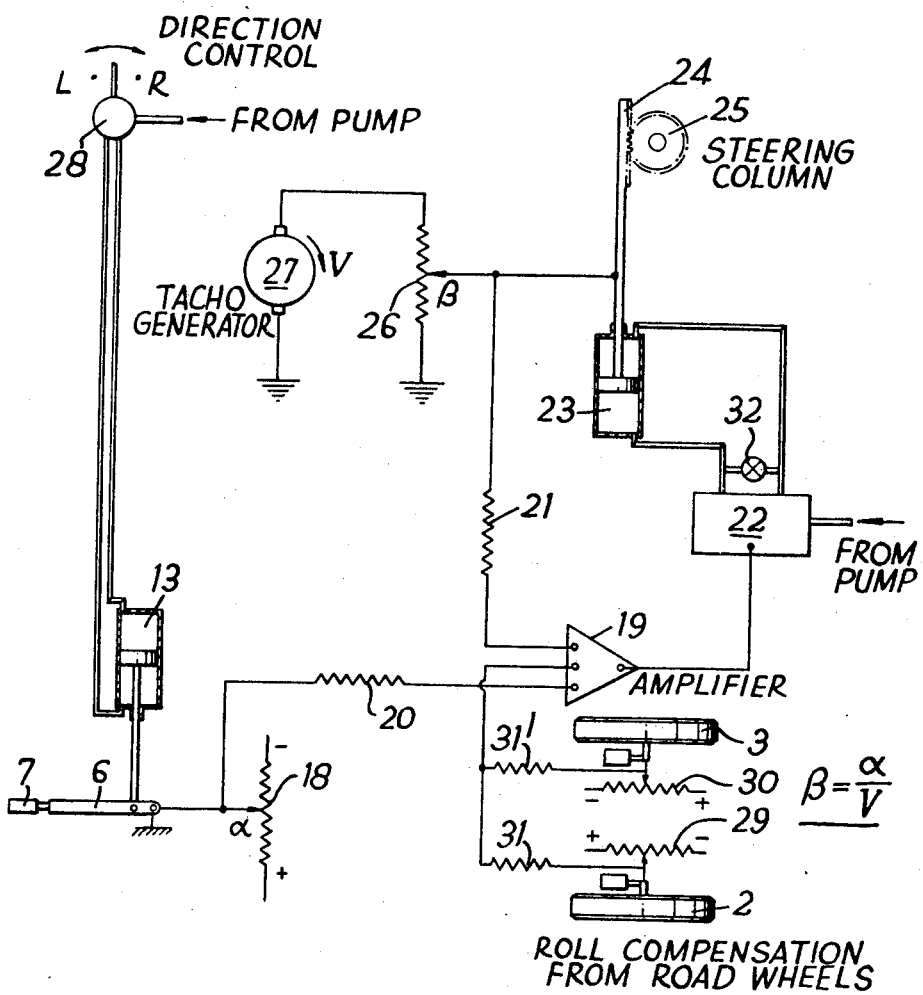

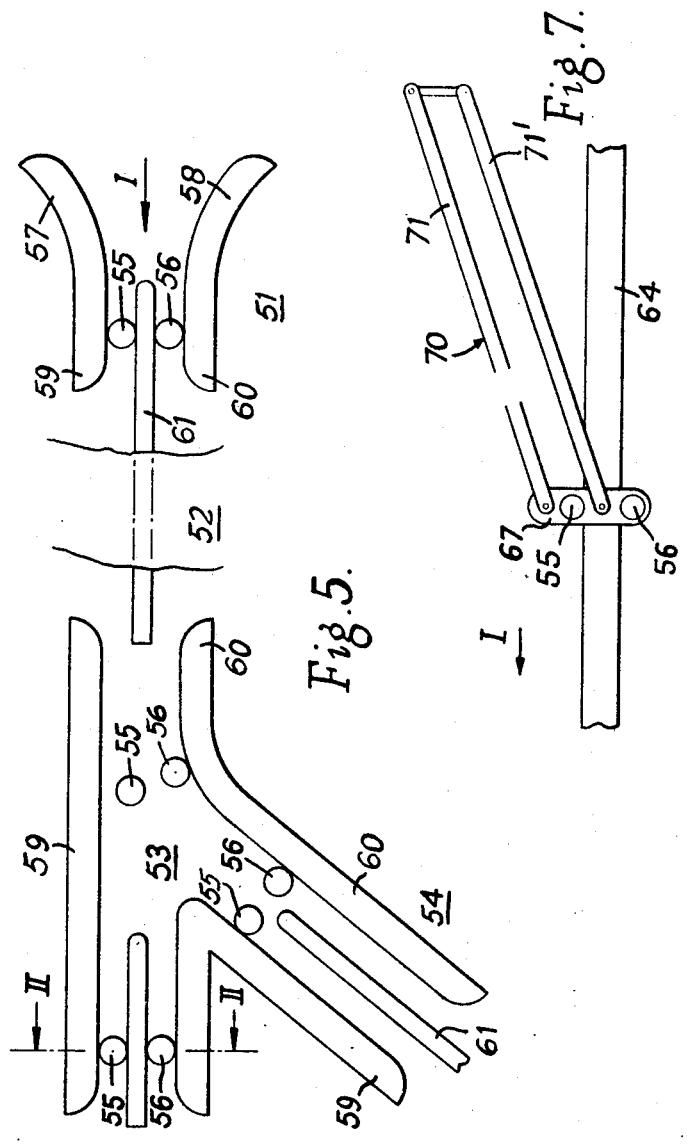

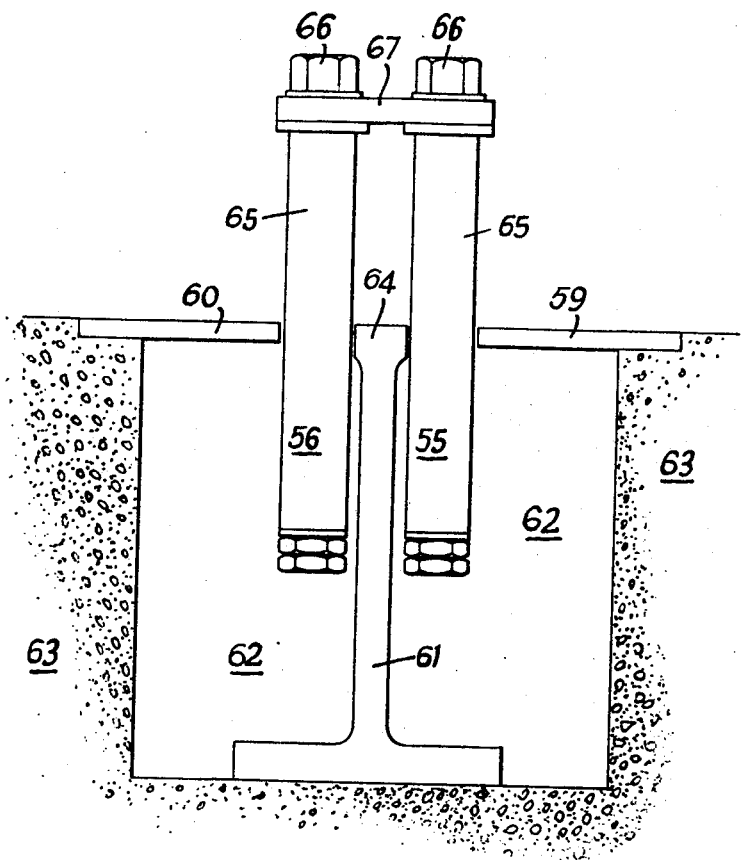

United States Patent Office 3,492,949
Patented Feb. 3, 1970

3,492,949
STEERING VEHICLES ALONG A TRACK
Norman Kenneth Brown, Binfield, England, assignor to Sperry Rand Limited, London, England, a company of Great Britain
Filed Dec. 15, 1967, Ser. No. 691,048
Claims priority, application Great Britain, Dec. 15, 1966, 56,162/66
Int. Cl. B61f 9/00; B61k 5/02
U.S. Cl. 104—244.1                                  7 Claims

ABSTRACT OF THE DISCLOSURE

A single or double pin follower on the end of a pivoted arm engages a rail or slot guideway in a track. The arm can be pivoted to lift the follower out of engagement with the guideway. Lateral movement of the follower causes the steering gear of the vehicle to be adjusted so that the vehicle automatically follows the line of the guideway. Biasing means for selectively urging the follower transversely to the guideway are provided. The system can be disabled so that the vehicle can be manually steered when desired.

CROSS-REFERENCE

U.S. Patent application Ser. No. 683,496 filed Nov. 16, 1967, in the name of David Alan Howells (assigned to the assignees of the present application) and entitled "Transmission System" shows an actuation system for controlling the steering of a vehicle, suitable for use in conjunction with the follower and arrangement of the present invention.

The present invention relates to a vehicle guidance system including means for steering a vehicle along a track.

The invention provides a guidance system for controlling the steering of a vehicle so that it can be automatically steered along a track provided with a guideway, said system comprising follower means for engagement with said guideway, said follower means being mounted to pivot about a vertical axis so that lateral movement of the vehicle relative to the guideway causes a movement about the vertical axis, sensing means for sensing said movement, and control means for adjusting the steering of the vehicle in the sense to reduce said sensed movement to zero, said follower means also being mounted so as to be retracted upwardly out of engagement with the guideway.

Preferably said follower means is mounted on arm means extending forwardly and downwardly from the front axle of the vehicle, said arm means being mounted at its upper, rear end to pivot about a horizontal axis and there being retracting means operating to pivot said arm means in a generally upward direction about said horizontal axis.

Said retracting means may comprise lever means mounted at its upper end to pivot about a horizontal axis on body structure of the vehicle forward of said front axle, its lower end engaging the lower end of said arm means so as to apply only upward pressure thereto, and drive means for rotating said lever means about said horizontal axis so as to apply upward pressure to the arm means.

In one embodiment said follower means comprises a pair of pins spaced apart along a line normal to a guide rail by a distance such that the pins can straddle the guide rail which comprises part of said guideway, said pins being mounted on a support capable of pivoting so as to allow said pins to remain located approximately spaced along said line normal to said rail.

This embodiment may be combined with the track provided with a guideway, said track comprising a guide rail at sections of the track where only one route is provided, and a slot, the inner edges of which are engaged respectively by each of said pair of pins, in the vicinity of sections where alternative routes are possible.

The invention will be described, by way of example, with reference to the drawings, in which:—

FIGURE 1 is a diagrammatic sectional front elevation of a vehicle and track, showing track-following means and part of the guidance system, FIGURE 2 is a plan view of the guideway of the track of FIGURE 1, at a point where the track forks, FIGURE 3 is a diagrammatic side view of an alternative form of support for the follower, FIGURE 4 is a diagram of an electro-hydraulic guidance system suitable for use with the arrangements of FIGURES 1 and 2, FIGURE 5 is a diagrammatic plan view of an alternative form of track and track-following means, FIGURE 6 is a sectional view of the track and part of the track-following means of FIGURE 5, and FIGURE 7 is a diagrammatic plan view of the track-following means of FIGURES 5 and 6.

Referring first to FIGURES 1 and 2, the vehicle body is supported on road wheels, of which the two front steering wheels 2 and 3 appear in the drawing. A strut 4 extending between the axle mountings of the wheels carries a box 5 containing part of the vehicle guidance system, and from which extends generally forwardly a telescopic arm 6 pivoted about a vertical axis within the box 5 so as to be free to move from side to side. This arm is bent downwards and at its lower end carries a pin-like follower 7 which engages in a slot forming the guideway of the track along which the vehicle is to be guided. The movements of the arm 6 about the vertical axis are used to adjust the steering of the vehicle automatically to maintain the arm 6 at a substantially constant angle relative to the slot and so guide the vehicle along the slot.

The vehicle runs along a concrete track 8 provided with a central channel 9. The upper edge of this channel is partly closed by a pair of flat steel plates 10 and 11, which define the slot within which the follower 7 is guided. The channel 9 is enlarged below and is provided with means for drainage and cleaning. It may also contain heating cables for clearing the slot of snow and ice in wintry weather and signalling or control cables. The follower 7 may contain a pick-up for receiving a signal from such signalling or control cable.

Referring now to FIGURE 2, the figure shows a plan view of the plates 10 and 11 forming the guideway at a point at which the track forks. At the point 12 at which the slot divides, the vehicle may be caused to take either of the diverging paths at will by applying a suitable bias to the follower to urge it to left or right as required. Referring back to FIGURE 1, the figure shows an actuator 13 mounted from the box 5 and arranged to act on the telescopic arm 6 for this purpose.

The telescopic arm 6 can be retracted (e.g. by a hydraulic jack energised by the driver operating a valve) so that the follower 7 is withdrawn from the slot, and the vehicle can then run on a normal multi-purpose roadway as described in more detail hereinafter.

FIGURE 3 illustrates an alternative method of supporting the follower 7 so that it can be withdrawn from the channel 9. An arm 40 extends forwardly and downwardly from the box 5 and has a pivotal mounting for the follower 7 at its forward and lower end allowing relative pivotal movement about a horizontal axis. At its rearward and upper end it is also pivotally mounted with freedom about a horizontal axis relative to a member 41 which, like telescopic arm 6, is itself pivoted about a vertical axis within the box 5.

As stated above, the box 5 is mounted on the wheel axle structure of the vehicle and thus moves relatively little in the up-and-down direction. The body of the vehicle is mounted on springs on the wheel axles and therefore is subjected to a comparatively large up-and-down movement, e.g. of the order of 5 inches maximum. It is for this reason that the box 5 is mounted on the axle rather than the body. However, in order to sense deviations of the vehicle from the guided track as soon as possible, the arm 40 extends forwardly from the axle The body of the vehicle also extends forwardly from the axle. In order to support and also to retract the arm 40, a further pivoted lever 43 is attached at its upper end to structure of the vehicle body with drive means (not shown) for driving the lever 43 about a horizontal axis in the direction of the arrow. The lower end of lever 43 is hooked around the arm 40 at 44. As lever 43 is rotated the hooked end 44 pushes the arm 40 upward so retracting the follower 7 from the channel 9. As the arm 40 rises, the top of arm 40 engages a cam face 45 also mounted on the body structure of the vehicle, the cam being shaped so that the follower 7 is caused to rotate relative to the arm 40 and to lie flat against the underside of the body structure. A spring 46 opposes this movement and return the follower to the position shown in FIGURE 3 when the arm 40 is lowered.

In use therefore the arm 40 is supported at its upper end by member 41 and close to its lower end by hook 44. When the vehicle's springs are caused to extend the lever 43 rises bodily so lifting the follower 7, and the length of the follower normally engaging in the channel is arranged to be such that the follower 7 still engages the channel even with the vehicle body in its highest position. When the vehicle's springs are caused to compress, the lever 43 drops and follower 7 also drops until a guard 47 touches the slot opening and prevents further dropping of the follower. Thereafter further dropping of the lever 43 can occur but the hook 44 parts from the arm 40. In this condition the arm 40 is still supported at both ends, the support of hook 44 being replaced by the guard 47 sliding along the top of the slot opening.

FIGURE 4 shows a steering control circuit for a vehicle suitable for use with the arrangement of FIGURE 1 or FIGURE 3.

The circuit is an electro-hydraulic arrangement and the arm 6 carrying the follower 7 operates a potentiometric pick-off 18 providing a voltage $\alpha$ representing the displacement of the arm about the vertical axis to an amplifier 19 through a proportioning resistor 20. A feedback voltage $\beta$ indicating the output displacement of the steering system is also supplied through a proportioning resistor 21 to the amplifier 19, and the difference of these voltages, after amplification, is applied to an electric-hydraulic control valve 22 which operates an actuator 23. The arm of this actuator carries a rack 24 meshing with a pinion wheel 25 on the steering column which is connected to a conventional steering mechanism (not shown). The arm is also coupled to a potentiometric pick-off 26, from which is derived from the voltage $\beta$ representing the steering system displacement, applied to the amplifier 19 through the proportioning resistor 21.

The electrical supply to the potentiometric pick-off 18 is derived from the vehicle batteries and is therefore at a substantial constant voltage. The supply to the potentiometric pick-off 26 is derived from a DC tachogenerator 27 which is coupled to the transmission system of the vehicle, or directly to the road wheels so that its speed of rotation, and consequently its output voltage, are proportional to vehicle speed V.

The bias actuator 13 is hydraulic, and is coupled to a directional control valve 28. When this valve is in the central, neutral position, the two sides of the actuator are interconnected so that hydraulic fluid can flow freely from one side to the other and the actuator does not interfere with the movement of the arm 6. By displacing the control valve 28, hydraulic pressure can be applied to one or the other side of the actuator 13 to bias it to cause it to follow either the left-hand or the right-hand path at a fork as described above.

In operation of the arrangement as so far described, the control valve is in the neutral position and the follower 7 engages the slot in the guideway. If the wheels depart from a symmetrical position with regard to the guide slot the arm 6 is displaced, feeding a voltage $\alpha$ through the resistor 20 to the amplifier 19, which provides an output to the electro-hydraulic control valve 22. This applies hydraulic pressure to one side or the other of the actuator 23, rotating the steering column pinion 25 by means of the rack 24, and also changing the setting of the potentiometric pick-off 26. Movement continues until the voltage $\beta$ derived from the pick-off 26 and applied through the proportioning resistor 21 exactly neutralises that derived from the pick-off 18. As the excitation of the pick-off 26 is proportional to road speed, the movement of the steering column is inversely proportional to speed, as is required for safe and efficient control.

FIGURE 4 also shows a further optional feature which may be incorporated if necessary. In FIGURE 1 the follower of the guidance system is shown as being supported from a strut 4 between the axle mountings of the steering wheels 2 and 3. In some circumstances this may not be a convenient arrangement and it may be necessary to mount the guidance system on the vehicle body 1. In this case the guidance system will partake of a roll component of motion due to rocking of the vehicle body about its suspension spring and this will be fed into the guidance system via the arm 6 where it will appear as a spurious steering signal.

In order to neutralise this signal there is provided at each of the wheels 2 and 3 a potentiometric pick-off 29, 30 respectively, which measures the compression of the vehicle springs bearing the loads at these two wheels. The voltages from these, which are conected to the vehicle battery in oposite senses, are fed through equal proportioning resistors 31, 31' to the amplifier 19, where their difference provides a signal proportional to the roll motion of the vehicle body relative to the wheels. By suitably choosing the values of the resistors 31, 31', this signal may be made to cancel the spurious signal due to roll at the follower arm 6.

A by-pass valve 32 enables the automatic control system to be disabled when it is required to steer the vehicle manually. This valve may be coupled to the hydraulic jack (not shown) for extending the telescopic arm 6, so the valve is opened when the arm is retracted, and closed when the arm is extended and power applied to the amplifier 19.

Referring now to the alternative track and follower of FIGURES 5, 6 and 7, it is assumed that the vehicle travels from right to left in the direction of the arrow I. The drawing shows a lead-in section of track 51, a high speed transit section 52, the majority of which is shown dotted, a junction section 53 and a branch section 54.

The guide track consists of a left-hand guide rail, a control main guide rail and a right-hand guide rail. The feeler elements are shown in FIGURE 5 at various positions along the track and are given the reference numbers 55 and 56.

The section 5 comprises a pair of lead-in rails 57 and 58 which guide the feeler elements 55 and 56 into a slot of predetermined width formed by slot guide rails 59 and 60 where it engages a main guide rail 61. Once the feeler elements have engaged the main rail 61 and the steering signal is no longer derived from the side rails 59 and 60 it is possible to discontinue the rails 59 and 60 for the high speed section 52 where only one route is possible.

As the junction section 53 is approached, the side rails 59 and 60 are re-instated so that they overlap with a length of the main guide rail 61. By the end of the overlap section, the source of the steering signal is transferred from the rail 61 to either the right-hand rail 59 or to the left-hand rail 60 depending upon the selection of routes made by the driver. After the junction section 53, a main guide rail 61 is again engaged by the elements 55 and 56 and the control signal for the steering mechanism is again derived from the main guide rail 61.

FIGURE 6 shows the main guide rail 61 mounted by means of bolts (not shown) within a channel 62 formed in the trackway 63. The side rails 59 and 60 are formed by steel plates let into the surface of the trackway 63. The rail 61 has a flange 64, the width of which is accurately controlled so as to be less, by say 1/32 of an inch than the distance between the inner surfaces of the feeler elements 55 and 56. The feeler elements 55 and 56 each consist of a roller 65 freely rotatably mounted on a spindle 66 which is secured to a plate 67. The plate 67 is attached to a movement sensing arrangement which produces a signal to control a hydraulic power steering arrangement for the vehicle.

In the absence of the main guide rail 61 the plate 67 is biased to the right or left so that feeler element 55 or 56 bears against the rail 59 or 60 respectively and so follows the course of the side rail which it engages. Over sections of the track which include junctions the distance between the rails 59 and 60 has to be accurately maintained.

The width of the flange 64 is as stated above only 1/32 inch less than the distance between the inner surfaces of feeler elements 55 and 56. Consideration of the plan view of FIGURE 7 will therefore show that plate 67 must always lie close to perpendicular to the flange 64, otherwise the elements 55 and 56 would become clamped to the flange 64. In order to allow for this when the vehicle is at an angle to the guided direction as shown in the view of FIGURE 7, the elements 55 and 56 are supported on a rectangular pivoted linkage 70. The two longer links 71, 71' of the linkage extend forward and downward from a box mounted on the vehicle axle, similar to the arm 40. The linkage is associated with retracting means (not shown) for lifting the feeler elements out of engagement with the flange 64.

The retracting means may be similar to that of FIGURE 3, or may comprise a flexible cable attached to the plate 67 and extending to the box 5, from where it is pulled to lift the feeler elements.

What is claimed is:

1. A guidance system for automatically steering a vehicle along a track provided with a guideway, said system comprising,
   follower means for engaging said guideway, said follower means being pivotally mounted to said vehicle whereby said follower means is free to move laterally with respect to said vehicle,
   follower sensing means coupled to said follower means for providing a follower signal in accordance with said lateral motion,
   control means responsive to said follower signal for actuating the steering mechanism of said vehicle whereby said steering mechanism is moved in a direction and by an amount dependent on said follower signal, and
   biasing means fastened to said vehicle for selectively urging said follower means rightwardly or leftwardly in a lateral direction with respect to said vehicle.

2. A guidance system of the character recited in claim 1 in which said biasing means comprises
   a source of mechanical force,
   a linkage coupled to said follower means for transmitting said mechanical force thereto in a lateral direction with respect to said vehicle, and
   direction control means for selectively directing said force rightwardly or leftwardly with respect to said vehicle thereby urging said follower means against a righthand side or a lefthand side of said guideway respectively.

3. A guidance system of the character recited in claim 1 in which said control means comprises
   steering sensing means coupled to said steering mechanism for providing a feedback signal in accordance with said motion of said steering mechanism,
   signal comparison means for comparing said follower signal with said feedback signal and providing an error signal in accordance with the difference therebetween, and
   steering actuation means responsive to said error signal for moving said steering mechanism in a direction and by an amount whereby the magnitude of said error signal is reduced.

4. A guidance system of the character recited in claim 3 in which said steering sensing means comprises
   a potentiometer with wiper mechanism coupled to said steering mechanism whereby said wiper mechanism is moved in accordance with said motion of said steering mechanism, and
   a source of reference potential coupled to said potentiometer for providing a reference potential thereto, which potential varies in accordance with the speed of said vehicle with respect to said track.

5. A guidance system of the character recited in claim 3 in which
   said system further includes roll sensing means for providing a roll signal in accordance with the roll motion of the body structure of said vehicle with respect to the road wheels thereof, and
   said signal comparison means further includes means for subtracting said roll signal from said follower signal thereby cancelling undesired follower signals resulting from said roll motion.

6. A guidance system of the character recited in claim 1 in which
   said follower means comprising mounting means pivotally mounted to the front axle structure of said vehicle whereby said mounting means is free to rotate about a vertical axis, arm means depending from said mounting means with freedom to rotate about a horizontal axis, and a guideway follower supported at the lower end of said arm means, and
   said system further includes retraction means comprising a lever pivotally mounted to the body structure of said vehicle forwardly of said front axle structure with freedom to rotate about a horizontal axis, said lever depending from said body structure and engaging beneath said arm means, and driving means for rotating said lever about said horizontal axis.

7. A guidance system of the character recited in claim 1 in which
   said follower means includes a pair of spaced apart follower pins for engaging said guideway, and
   said guideway comprises an upstanding guide rail at sections of said track where only one route is provided, said pair of pins straddling said rail, and a slot at sections of said track where more than one route is possible, said slot providing inner edges one of which is engaged by one of said pins or the other of which is engaged by the other of said pins selectively in accordance with said biasing means.

References Cited

UNITED STATES PATENTS

| | | | |
|---|---|---|---|
| 2,068,403 | 1/1937 | Ekstrom | 104—244.1 |
| 3,180,280 | 4/1965 | Kuch | 104—245 |
| 3,188,978 | 6/1965 | Dolphin | 104—247 |
| 3,254,608 | 6/1966 | Alden | 104—247 |

DRAYTON E. HOFFMAN, Primary Examiner

G. L. LIBMAN, Assistant Examiner

U.S. Cl. X.R.

180—79